(12) United States Patent
Wu

(10) Patent No.: US 6,923,089 B2
(45) Date of Patent: Aug. 2, 2005

(54) HANDLEBAR GRIP

(75) Inventor: Kuang-Hui Wu, Taichung Hsien (TW)

(73) Assignee: International Bicycle Products Corporation, Taichung Hsien (TW)

( * ) Notice: Subject to any disclaimer, the term of this patent is extended or adjusted under 35 U.S.C. 154(b) by 77 days.

(21) Appl. No.: 10/361,826

(22) Filed: Feb. 11, 2003

(65) Prior Publication Data

US 2004/0129107 A1 Jul. 8, 2004

(30) Foreign Application Priority Data

Jan. 6, 2003 (TW) ........................................ 92100166 A

(51) Int. Cl.[7] .............................................. B62K 11/14
(52) U.S. Cl. .................................................. 74/551.9
(58) Field of Search ............................ 74/551.1, 551.8, 74/551.9; 16/421

(56) References Cited

U.S. PATENT DOCUMENTS

| | | | | |
|---|---|---|---|---|
| 3,918,323 A | * | 11/1975 | Prager | 74/551.8 |
| 4,535,649 A | * | 8/1985 | Stahel | 74/551.9 |
| 5,033,325 A | * | 7/1991 | Giard, Jr. | 74/551.3 |
| 5,285,696 A | * | 2/1994 | Taylor | 74/551.1 |
| 5,517,878 A | * | 5/1996 | Klein et al. | 74/551.3 |
| 6,308,590 B1 | * | 10/2001 | Berto | 74/551.8 |

* cited by examiner

Primary Examiner—Marcus Charles
Assistant Examiner—Vicky A. Johnson
(74) Attorney, Agent, or Firm—Browdy and Neimark, P.L.L.C.

(57) ABSTRACT

A grip includes a tubular grip body for mounting a vehicle handlebar. A locating member is fastened to one end of the grip body and partially inserted into the vehicle handlebar. A tightening up member is inserted into the inside of the vehicle handlebar. A nut is fastened to the tightening up member. A screw is mounted in the locating member and threaded into the nut in the tightening up member and adapted to drive the nut and the tightening up member toward the locating member and to radially force the tightening up member against the inside wall of the vehicle handlebar when fastened up.

14 Claims, 4 Drawing Sheets

HANDLEBAR GRIP

BACKGROUND OF THE INVENTION

1. Field of the Invention

The present invention relates to a handlebar grip particularly suitable for a transportation vehicle, for example, a bicycle, motorcycle or tricycle.

2. Description of the Related Art

The U.S. Pat. No. 5,280,735 discloses a prior art grip for a bicycle, which includes a pliable inner sleeve and a rigid outer housing adapted to be coupled to the exterior periphery of the inner sleeve. The housing includes a pair of end caps disposed at each end thereof. The end cap has a split extending therethrough, a first cavity and a complementary cavity disposed in the periphery thereof. Each cavity has an opening which extends into the split. A screw is adapted to be disposed through either of the cavities, the opening and split, and into the remaining cavity. A nut is threaded onto an end of the screw, which extends through the opening and into the remaining cavity. As the nut is tightened on the screw, and against the opening, the width of the split is reduced, thus reducing the diameter of the end cap. As the diameter of the end cap is reduced, a gripping force is applied to the inner sleeve for preventing the grip from rotating on a handlebar to which the grip is applied.

A problem with this grip is that it do not fasten securely to the handlebar for the gripping force being not applied uniformly to the inner sleeve by the end cap thus allowing relative slippage between the grip and the handlebar.

A further disadvantage of the prior art grip is that it still needs a stopper to seal the end of the handlebar.

SUMMARY OF THE INVENTION

It is therefore an object of the present invention to provide an improved grip, which can securely be fastened to a handlebar.

It is another object of the invention to provide a grip, which can rapidly and easily be fastened to a handlebar.

It is a further object of the invention to provide a grip, which is rapidly and easily removable from a handlebar These and other objects and advantages of the present invention are achieved by providing an improved handlebar grip, which comprises a tubular grip body slightly larger in inner diameter than a handlebar for enabling an end thereof to be inserted into said grip body. A tightening up means is adapted to fix the grip body to the handlebar. The tightening up means comprises a locating member, a tightening up member, a screw, and female screw means. The locating member having a through hole axially extended through two ends thereof is mounted in a first end of said grip body in such a way that it is prevented from relative slippage to said grip body. The tightening up member is movably inserted into the end of the handlebar. The female screw means is disposed in said tightening up member. The screw has a head stopped on one end of said locating member and a threaded body is inserted through the through hole of said locating member and threaded into said female screw means. The locating and tightening up members are shaped in such a way that as the screw is screwed up, the tightening up member will be driven toward said locating member and forced radially against an inside wall of the handlebar to which the grip is applied.

DETAILED DESCRIPTION OF THE INVENTION

Referring to FIGS. 1~5, there depicts an embodiment of a handlebar grip 10 within the present invention. The grip 10 includes a grip body 20, a chuck 28, and a tightening up means 30.

Figure 1:
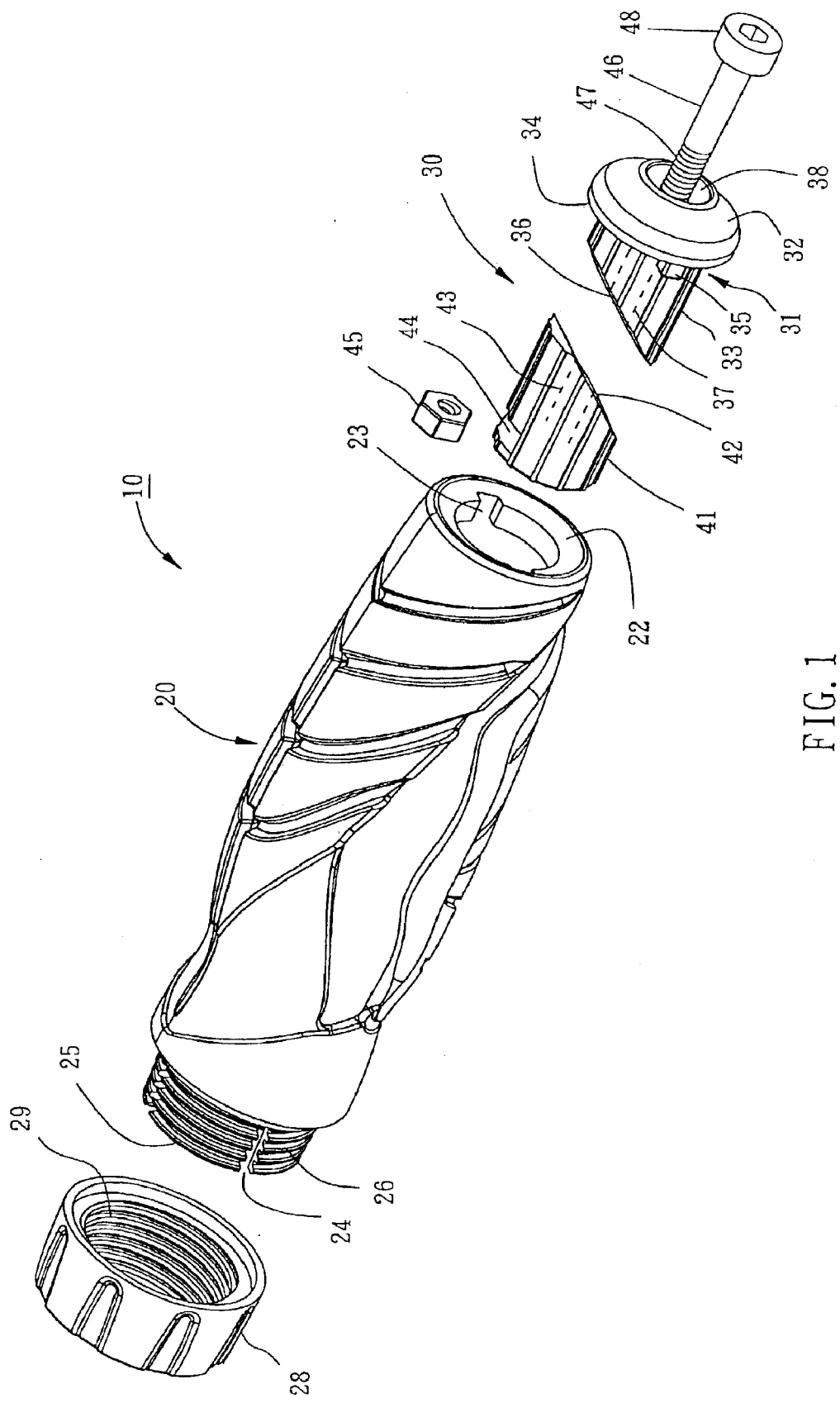
FIG. 1 is an exploded view of a handlebar grip constructed according to an embodiment of the present invention.
Figure 2:
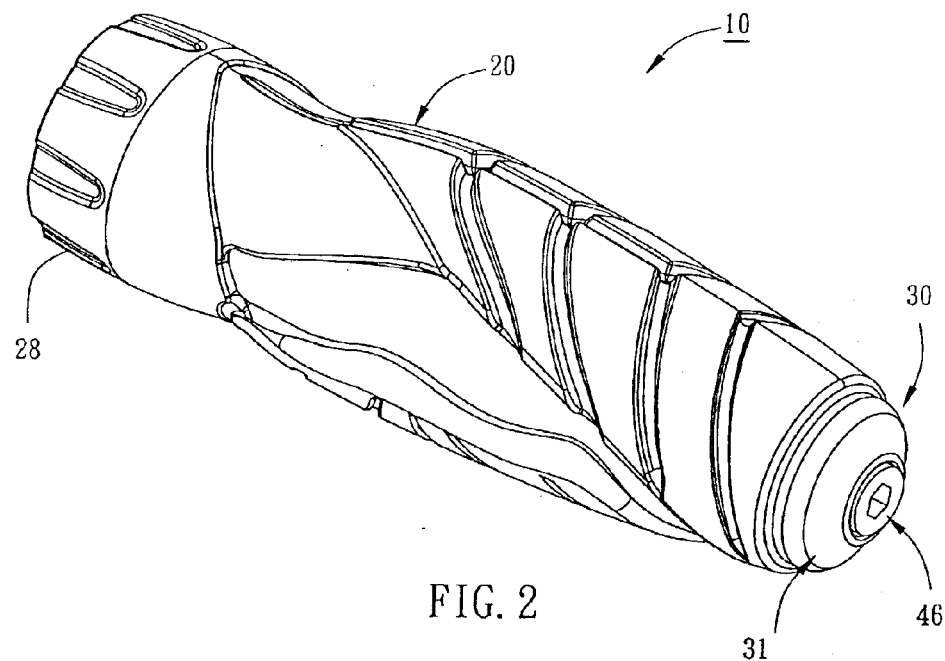
FIG. 2 is an elevational assembly view of the handlebar grip as shown in FIG. 1.
Figure 3:
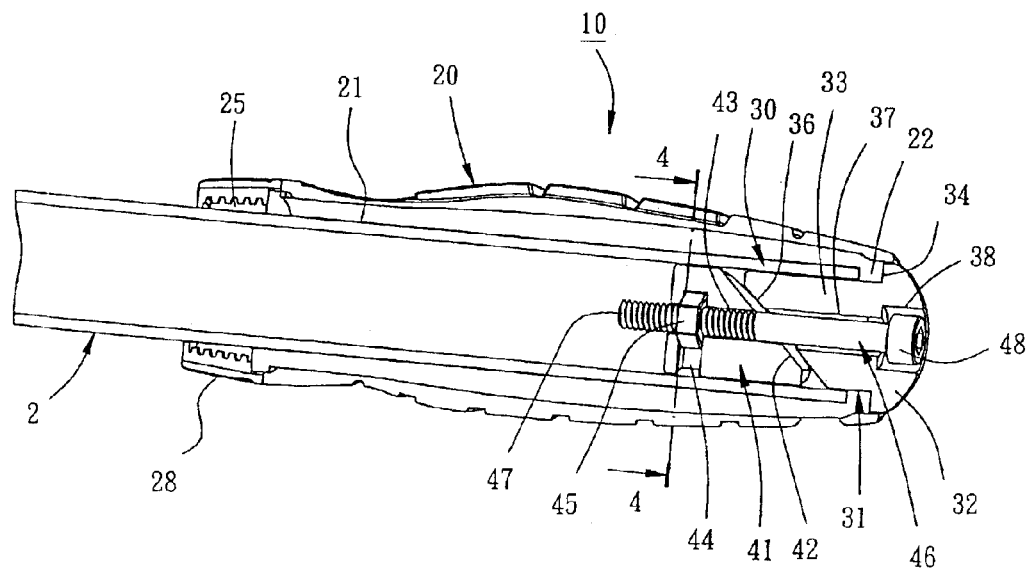
FIG. 3 is a cross-sectional side view of the handlebar grip as shown in FIG.2 with a vehicle handlebar section inserted in the grip.

The grip body 20 is a substantially tubular member adapted to receive a handlebar 2 (as shown in FIG. 3). The first end of the grip body 20 (the right end as shown in FIG. 1) has an inside annular flange 22 having two notches 23 at two opposite sides. The second end of the grip body 20 has four longitudinally extended crevices 24 equiangularly formed therein (the left end as shown in FIG. 1) to separate the second end of the grip body 20 into four pliable strips 25. Outer threads 26 are formed in the outer walls of the pliable strips 25.

The chuck 28 has inner threads 29 disposed in the tapered inside wall thereof and adapted to engage the outer threads 26 of the grip body 20. The chuck 28 is mounted on the second end of the grip body 20 over the pliable strips 25. When fastening up the chuck 28, the four transversely arched strips 25 are radially inwardly compressed.

The tightening up means 30 includes a locating member 31, an elastomeric tightening up member 41, a nut 45, and a screw 46. The locating member 31 has a head 32, a shank 33 axially extended from one side of the head 32, and a shoulder 34 formed between the head 32 and the shank 33. The outer diameter of the shank 33 fits the inner diameter of the inside annular flange 22 (see FIG. 3). The shank 33 has two wedge blocks 35 symmetrically protruded from the periphery at two opposite sides and respectively abutted against the shoulder 34, and a beveled guide face 36 at the free end remote from the round head 32). Further, the locating member 31 has a through hole 37 axially extended through the head 32 and the shank 33. The head 32 has a top recess 38 around one end of the through hole 37. The shank 33 is inserted into the first end of the grip body 20 to engage the wedge blocks 35 into the notches 23 of the inside annular flange 22 of the grip body 20, keeping the shoulder 34 stopped against the inside annular flange 22. When installed, the locating member 31 is prevented from slippage motion relative to the grip body 20.

The elastomeric tightening up member 41 is a cylindrical member axially disposed inside the grip body 20. The outer diameter of the tightening up member 41 is slightly smaller than the inner diameter of the handlebar so that the tightening up member 41 can be inserted axially into the handlebar 2. The tightening up member 41 has a beveled guide ace 42 at one end adapted to engage the beveled guide face 36 of the locating member 31, a center through hole 43 axially extended through the ends, and an insertion hole 44 radially inwardly extended from the periphery across the center through hole 43. The inner end of the insertion hole 44 is shaped for holding the nut 45.

The nut 45 is inserted into the insertion hole 44 of the tightening up member 41 against the inner end of the insertion hole 44, and prohibited from axial displacement and rotary motion relative to the tightening up member 41.

The screw 46 has a threaded body 47 inserted from an outer side of the locating member 31 (the side corresponding to the round head 32) through the through hole 37 of the locating member 31 and the center through hole 43 of the tightening up member 41 and threaded into the nut 45 inside the tightening up member 41, and a head 48 fitted into the top recess 38 of the locating member 31.

Figure 4:
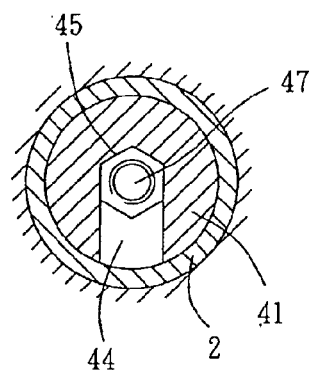
FIG. 4 is a sectional view taken along line 4—4 of FIG. 3.
Figure 5:
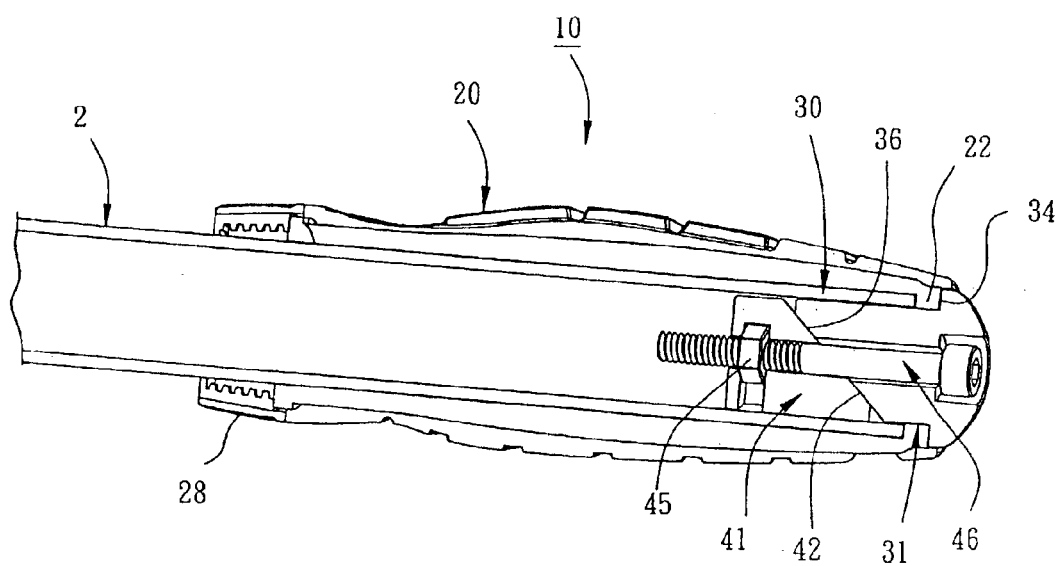
FIG. 5 is similar to FIG. 3 but showing the grip fixed in position.

The installation procedure of the grip 10 is outlined hereinafter with reference to FIGS. 3~5. The grip body 20 is sleeved onto the handlebar 2 to force the tightening up member 41 and the shank 33 of the locating member 31 into the inside of the handlebar 2, keeping the pliable strips 25 extended in direction toward the handlebar 2, the inside annular flange 22 of the grip body 20 stopped at the outer end edge of the handlebar 2 (The tightening up means 30 can of course be installed in the grip body 20 after the grip body 20 has been sleeved onto the handlebar 2). Thereafter, when the screw 46 is screwed up, the tightening up member 41 is driven to move toward the locating member 31. For the distance between the tightening up member 41 and the locating member 31 being designed within a predetermined range, the tightening up member 41 is soon forced to abut against the locating member 31 (in other words, the beveled guide face 42 of the tightening up member 41 will be stopped by the beveled guide face 36 of the locating member 31.) and prohibited from further moving. Therefore, as the screw 46 is screwed up continuously, the tightening up member 41 will be moved axially toward the locating member 31 till the beveled guide face 42 of the tightening up member 41 closely attached to the beveled guide face 36 of the locating member 31. In this time, if the screw 46 is still screwed up, the tightening up member 41 will be radially forced against the inside wall of the handlebar 2 in reversed directions (see FIG. 5), and at the same time the inside annular flange 22 of the grip body 20 is forced inwardly against the periphery of the handlebar 2. Finally, the chuck 28 is fastened up to compress the pliable strips 25 of the grip body 20 radially inwardly against the handlebar 2. Thus, the grip 10 is firmly fixed to the handlebar 2.

When removing the grip 10 from the handlebar 2, reverse the aforesaid mounting procedure.

As indicated above, for one side (the whole axial length) of the periphery of the tightening up member 41 being forced against the inside wall of the handlebar 2, and the pliable strips 25 of the grip body 20 being compressed radially inwardly against the handlebar 2, the grip 10 of the present invention can be fixed securely to the handlebar 2. Furthermore, for the whole installation procedure being done just by screwing up the screw 46 and fastening the chuck 28, the grip 10 can rapidly and easily be fastened to and removed from the handlebar 2 on which the grip 10 is installed.

In the aforesaid embodiment of the present invention, the nut 45 is an independent member inserted in the insertion hole 44 of the tightening up member 41. Alternatively, a screw hole can be directly formed in the tightening up member 41 for receiving the screw 46.

Figure 6:
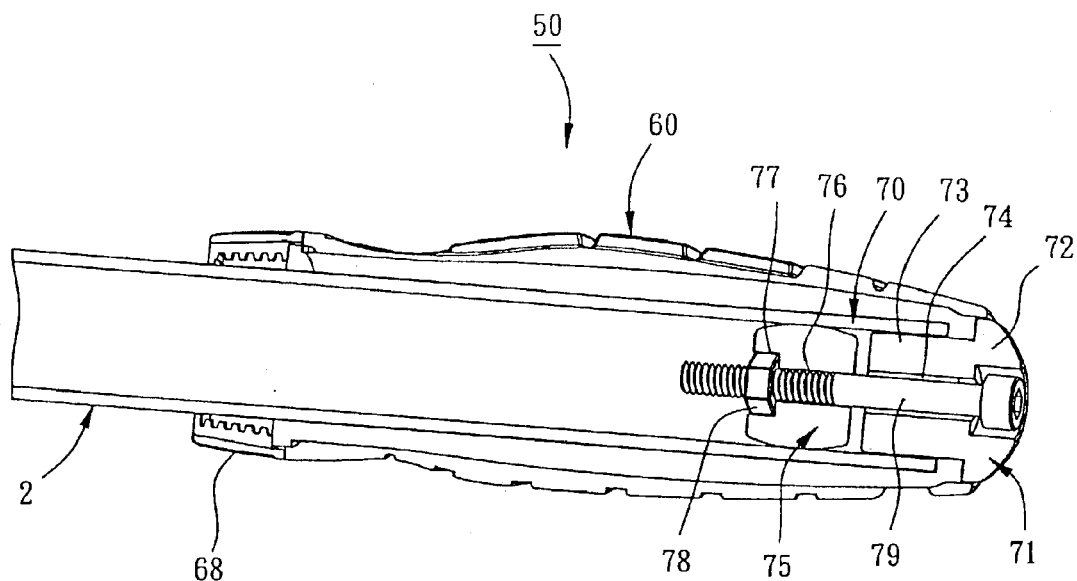
FIG. 6 is a cross-sectional side view of a handlebar grip constructed according to another embodiment of the present invention.
Figure 7:
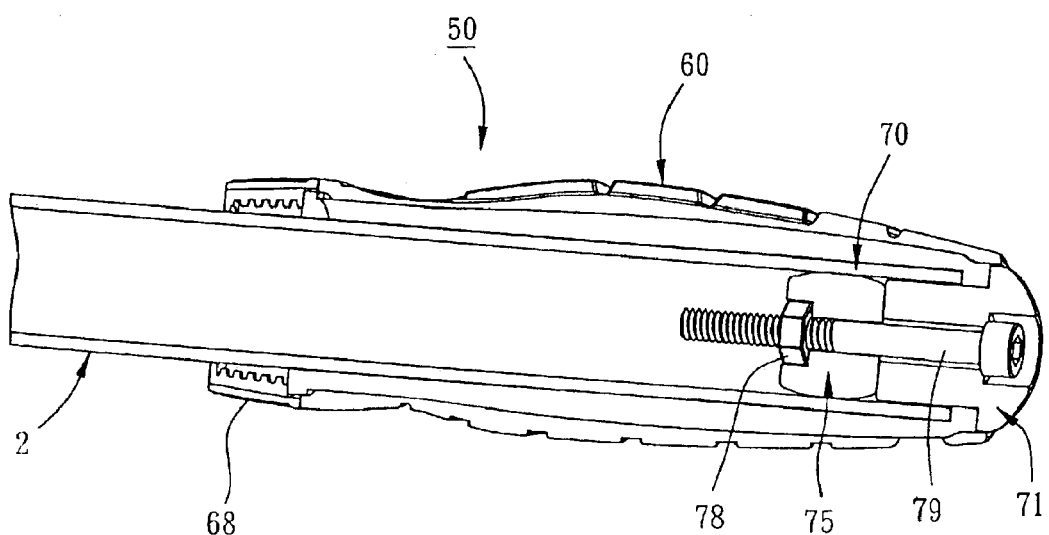
FIG. 7 is similar to FIG. 6 but showing the grip fixed in position.

FIG. 6 shows another embodiment of the present invention. According to this embodiment, the grip 50 includes a grip body 60, a chuck 68, and a tightening up means 70. The shape and relative arrangement of the grip body 60 and the chuck 68 are same as the equivalent members in the aforesaid embodiment of the present invention. The tightening up means 70 comprises a locating member 71, a tightening up member 75, a nut 78, and a screw 79. The locating member 71 has a head 72 stopped outside the grip body 60, a shank 73 axially extended from the head 72 and inserted into the handlebar 2 inside the grip body 60, and a through hole 74 axially extended through the head 71 and the shank 73. The tightening up member 75 is a drum-like (or ball-like) rubber block. When not compressed, the outer diameter of the tightening up member 75 is slightly smaller than the inner diameter of the handlebar 2. However, when axially compressed from the two ends, the tightening up member 75 is deformed, and the outer diameter of the tightening up member 75 becomes greater than the inner diameter of the handlebar 2. The tightening up member 75 has a center through hole 76 axially extended through the ends, and a hexagonal recess 77 in the center of one end (the end remote from the locating member 71) for accommodating the nut 78. The screw 79 is inserted through the through hole 74 of the locating member 71 and the through hole 76 of the tightening up member 75 and threaded into the nut 78 been positioned in the hexagonal recess 77 of the tightening up member 75.

During installation, the tightening up member 75 is inserted into the handlebar 2 (the periphery of the tightening up member 75 slightly touches the inside wall of the vehicle handlebar), and then the screw 79 is screwed up. When screwing the screw 79, the nut 78 is driven to move along the screw bolt 79 to force the tightening up member 75 against the locating member 71, and therefore the tightening up member 75 is deformed and radially expanded against the inside wall of the handlebar 2, securing the grip 50 to the handlebar 2, preventing the grip 50 from axial displacement and rotary motion relative to the handlebar 2.

As indicated above, the present invention provides a handlebar grip that can easily and rapidly be installed in or removed from the vehicle handlebar without any special implements or tools. Therefore, the user can easily remove the grip from the vehicle handlebar for a replacement when necessary. Furthermore, because the whole axial length of the periphery of the tightening up member is forced against the inside wall of the vehicle handlebar, the grip does not slip when installed.

What is claimed is:

1. A grip for applying to one end of a tubular vehicle handlebar, comprising:

a tubular grip body slightly larger in inner diameter than the handlebar for enabling an end thereof to be inserted into said grip body; and a tightening up means adapted to fix said grip body to the handlebar, said tighten up means comprising a locating member mounted in a first end of said grip body in such a way that it is prevented from relative slippage to said grip body, said locating member having a through hole axially extended through two ends thereof, an elastomeric tightening up member inserted into the end of the handlebar, female screw means disposed in said elastomeric tightening up member, and a screw having a head stopped on one end of said locating member and a threaded body inserted through the through hole of said locating member and threaded into said female screw means; and said locating member and said tightening up member shaped in such a way that as said screw is screwed up, said tightening up member will be driven toward said locating member and the tightening up member forced radially to abut against an inside wall of the handlebar;

wherein said locating member has a shank insertable in one end of the handlebar to which said tubular grip body is applied and a beveled guide face formed on a free end of said shank; said tightening up member has a cylindrically shaped body having a beveled guide face formed in one end thereof and facing the beveled guide face of said locating member;

wherein said tightening up member has an axially extended center through hole corresponding to the center through hole of said locating member; said female screw means is a nut mounted in said tightening up member concentric to the center through hole of said tightening up member and threaded onto the threaded body of said screw; and wherein said tightening up member has an insertion hole radially inwardly extended from the periphery thereof across the center through hole of said tightening up member and adapted to accommodate said nut, said insertion hole having an inner end shaped to fit the contour of said nut.

2. The grip as claimed in claim 1, wherein said female screw means is formed integral with the center trough hole of said tightening up member.

3. The grip as claimed in claim 1, wherein the diameter of the body of said tightening up member is slightly smaller than the inner diameter of the handlebar to which said grip body is applied.

4. The grip as claimed in claim 1, wherein said tightening up member has an axially extended center through hole corresponding to the center through hole of said locating member, said tightening up member has an outer diameter slightly smaller than the inner diameter of the handlebar to which said grip body is applied before compression, and said tightening up member can be radially expanded and peripherally forced to abut against an inside wall of the handlebar to which said tubular grip body is applied when axially compressed from two ends thereof when said female screw means is mounted in said tightening up member concentric to the center through hole of said tightening up member and threaded onto the threaded body of said screw, so that when said screw is screwed up, said tightening up member will be driven toward said locating member and compressed by said locating member to radially expand and abut against the inside wall of the handle bar.

5. The grip as claimed in claim 1, wherein said tubular grip body has an inside annular flange disposed in the first end, said inside annular flange having a notch; said locating member has a head stopped at said inside annular flange outside said tubular grip body, and a shank axially extended from said head and inserted through said inside annular flange into the inside of said tubular grip body, the shank of said locating member having a wedge block respectively engaged into the notch of said inside annular flange to prevent from relative slippage to said grip body.

6. The grip as claimed in claim 1, wherein said tubular grip body has a plurality of crevices formed in a second end thereof to separate said second end into a plurality of pliable strips, and outer threads formed on said pliable strips; the grip further comprises a chuck having a tapered inside wall, inner threads disposed on said inside wall for threading onto the outer threads of said tubular grip body, whereby when said chuck is fastened up, said pliable strips are radially inwardly compressed and firmly fixed to the handlebar.

7. A grip for applying to one end of a tubular vehicle handlebar, comprising:

a tubular grip body slightly larger in inner diameter than the handlebar for enabling an end thereof to be inserted into said grip body; and a tightening up means adapted to fix said grip body to the handlebar, said tighten up means comprising a locating member mounted in a first end of said grip body in such a way that it is prevented from relative slippage to said grip body, said locating member having a through hole axially extended through two ends thereof, a tightening up member movably inserted into the end of the handlebar, female screw means disposed in said tightening up member, and a screw having a head stopped on one end of said locating member and a threaded body inserted through the through hole of said locating member and threaded into said female screw means; and said locating member and said tightening up member shaped in such a way that as said screw is screwed up, said tightening up member will be driven toward said locating member and forced radially against an inside wall of the handlebar, wherein said tubular grip body has an inside annular flange disposed in the first end, said inside annular flange having a notch; said locating member has a head stopped at said inside annular flange outside said tubular grip body, and a shank axially extended from said head and inserted through said inside annular flange into the inside of said tubular grip body, the shank of said locating member having a wedge block respectively engaged into the notch of said inside annular flange to prevent from relative slippage to said grip body.

8. The grip as claimed in claim 7, wherein said tightening up member has an axially extended center through hole corresponding to the center through hole of said locating member; said female screw means is a nut mounted in said tightening up member concentric to the center through hole of said tightening up member and threaded onto the threaded body of said screw.

9. The grip as claimed in claim 8, wherein said tightening up member has an insertion hole radially inwardly extended from the periphery thereof across the center through hole of said tightening up member and adapted to accommodate said nut, said insertion hole having an inner end shaped to fit the contour of said nut.

10. The grip as claimed in claim 7, where in said female screw means is formed integral with the center trough hole of said tightening up member.

11. The grip as claimed in claim 7, wherein the diameter of the body of said tightening up member is slightly smaller than the inner diameter of the handlebar to which said grip body is applied.

12. The grip as claimed in claim 7 wherein said tightening up member has an axially extended center through hole corresponding to the center through hole of said locating member, said tightening up member having an outer diameter slightly smaller than the inner diameter of the handlebar to which said grip body is applied before compression, said tightening up member being radially expanded and peripherally forced to abut against an inside wall of the handlebar to which said tubular grip body is applied when axially compressed from two ends thereof; said female screw means is mounted in said tightening up member concentric to the center through hole of said tightening up member and threaded onto the threaded body of said screw, whereby when said screw is screwed up, said tightening up member will be driven toward said locating member and compressed by said locating member to radially expand and abut against the inside wall of the handle bar.

13. The grip as claimed in claim 7, wherein said tubular grip body has an inside annular flange disposed in the first end, said inside annular flange having a notch; said locating member has a head stopped at said inside annular flange outside said tubular grip body, and a shank axially extended from said head and inserted through said inside annular flange into the inside of said tubular grip body, the shank of said locating member having a wedge block respectively engaged into the notch of said inside annular flange to prevent from relative slippage to said grip body.

14. The grip as claimed in claim 7, wherein said tubular grip body has a plurality of crevices formed in a second end thereof to separate said second end into a plurality of pliable strips, and outer threads formed on said pliable strips; the grip further comprises a chuck having a tapered inside wall, inner threads disposed on said inside wall for threading onto the outer threads of said tubular grip body, whereby when said chuck is fastened up, said pliable strips are radially inwardly compressed and firmly fixed to the handlebar.

* * * * *